United States Patent [19]

Jessen et al.

[11] Patent Number: 5,175,259

[45] Date of Patent: Dec. 29, 1992

[54] MONO- AND BIS-AZO COMPOUNDS CONTAINING 6-HYDROXY-3-HETEROCYCLIC ONIUM-PYRIDONE-2-GROUPINGS COUPLED TO DIAZO COMPONENTS CONTAINING DIAZINE OR TRIAZINE RINGS

[75] Inventors: Joerg L. Jessen, Speyer; Manfred Ruske, Ludwigshafen; Knut Kessel, Mannheim; Manfred Patsch, Wachenheim, all of Fed. Rep. of Germany

[73] Assignee: BASF Aktiengesellschaft, Ludwigshafen, Fed. Rep. of Germany

[21] Appl. No.: 843,193

[22] Filed: Feb. 28, 1992

[30] Foreign Application Priority Data

Mar. 8, 1991 [DE] Fed. Rep. of Germany ....... 4107377

[51] Int. Cl.⁵ .................... C09B 44/08; C09B 62/085; C09B 62/09; D06P 1/382
[52] U.S. Cl. .................................. 534/606; 534/634; 534/635
[58] Field of Search .................... 534/606, 634, 635; 8/549

[56] References Cited

U.S. PATENT DOCUMENTS

| | | | |
|---|---|---|---|
| 3,847,894 | 11/1974 | Ridyard | 534/635 |
| 4,299,764 | 11/1981 | Jager | 534/635 |
| 4,591,635 | 5/1986 | Greve et al. | 534/606 X |
| 4,673,735 | 6/1987 | Moser et al. | 534/606 |
| 4,742,161 | 5/1988 | Dore | 534/606 |
| 4,843,150 | 6/1989 | Hihara et al. | 534/635 X |
| 4,978,746 | 12/1990 | Herd | 534/635 X |
| 5,015,292 | 5/1991 | Bruder et al. | 534/606 X |
| 5,023,324 | 6/1991 | Moser | 534/606 |
| 5,037,964 | 8/1991 | Moser et al. | 534/606 X |

FOREIGN PATENT DOCUMENTS

| | | | |
|---|---|---|---|
| 0316778 | 5/1989 | European Pat. Off. | 534/634 |
| 0356860 | 3/1990 | European Pat. Off. | 534/635 |
| 2752282 | 6/1978 | Fed. Rep. of Germany | 534/606 |
| 3538517 | 5/1986 | Fed. Rep. of Germany | 534/635 |
| 2134701 | 12/1972 | France | 534/635 |
| 1596542 | 8/1981 | United Kingdom | 534/606 |

Primary Examiner—Floyd D. Higel
Attorney, Agent, or Firm—Oblon, Spivak, McClelland, Maier & Neustadt

[57] ABSTRACT

Reactive dyes of the formula

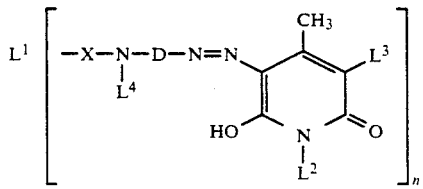

where n is 1 or 2,

X is a six-membered halogen-containing nitrogen heterocycle, $L^1$, depending on n, is fluorine, chlorine, $C_1$-$C_4$-alkoxy, phenoxy, $C_1$-$C_4$-alkyl, substituted or unsubstituted phenyl or a bridge member which has one or two hydroxysulfonyl groups, D is the radical of a diazo component of the aniline or naphthalene series which has at least one hydroxysulfonyl group, $L^2$ is hydrogen or substituted or unsubstituted $C_1$-$C_8$-alkyl, $L^3$ is the cationic radical of an aromatic heterocycle which is linked to the pyridone ring via a nitrogen atom, and $L^4$ is hydrogen or $C_1$-$C_4$-alkyl, with the proviso that the number of hydroxysulfonyl groups in the molecule exceeds that of the cationic groups by at least one, are useful for dyeing and printing hydroxyl- or nitrogen-containing substrates.

6 Claims, No Drawings

MONO- AND BIS-AZO COMPOUNDS CONTAINING 6-HYDROXY-3-HETEROCYCLIC ONIUM-PYRIDONE-2-GROUPINGS COUPLED TO DIAZO COMPONENTS CONTAINING DIAZINE OR TRIAZINE RINGS

The present invention relates to novel reactive dyes of the formula I

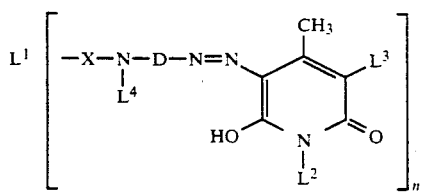

where
n is 1 or 2,
X in case a), when n is 1, is a radical of the formula IIa, IIb or IIc

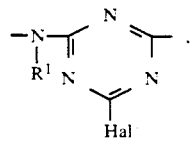

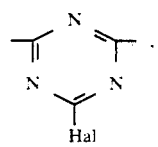

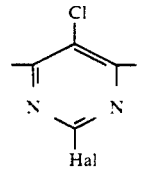

where
$R^1$ is hydrogen or $C_1$-$C_4$-alkyl and Hal fluorine or chlorine, or in case b), when n is 2, is a radical of the above-mentioned formula IIa,
$L^1$ in case a), when n is 1 and X is a radical of the formula IIb or IIc, is fluorine, chlorine, $C_1$-$C_4$-alkoxy or phenoxy, in case b), when n is 1 and X is a radical of the formula IIa, is $C_1$-$C_4$-alkyl or phenyl which may be monosubstituted or disubstituted by hydroxysulfonyl, or vinylsulfonyl or the radical

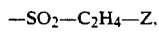
—$SO_2$—$C_2H_4$—Z.

where Z is a group which is detachable under alkaline reaction conditions, or in case c), when n is 2 and X is a radical of the formula IIa, is a bridge member which has one or two hydroxysulfonyl groups,
D is the radical of a diazo component of the aniline or aminonaphthalene series which has at least one hydroxysulfonyl group, $L^2$ is hydrogen or $C_1$-$C_8$-alkyl which may be hydroxyl-substituted and interrupted by one or two oxygen atoms in ether function,
$L^3$ is the cationic radical of a five- or six-membered aromatic heterocycle which has at least one nitrogen atom with or without one or two further hetero atoms selected from the group consisting of nitrogen, oxygen and sulfur and which is linked to the pyridone ring via the nitrogen atom, and
$L^4$ is hydrogen or $C_1$-$C_4$-alkyl, with the proviso that the number of hydroxysulfonyl groups in the molecule exceeds that of the cationic groups by at least one, and also to the use of the novel dyes for dyeing or printing hydroxyl- or nitrogen-containing substrates.
DE-A-2 752 282 and U.S. Pat. No. 4 673 735 disclose basic azo dyes whose coupling components are derived from hydroxypyridones which inter alia contain a pyridinium radical.
It is an object of the present invention to provide novel azo-based reactive dyes which are likewise derived from a hydroxypyridone derivative having a cationic heterocyclic radical. The novel dyes shall have good wet and light fastness properties in use.
We have found that this object is achieved by the reactive dyes of the formula I defined at the beginning.
Any alkyl appearing in the abovementioned formula I may be either straight-chain or branched.
$L^2$, $L^4$ and $R^1$ are each for example methyl, ethyl, propyl, isopropyl, butyl, isobutyl or sec-butyl.
$L^2$ may also be for example pentyl, isopentyl, neopentyl, tert-pentyl, hexyl, 2-methylpentyl, heptyl, 2-methylhexyl, octyl, 2-methylheptyl, 2-ethylhexyl, 2-methoxyethyl, 2-ethoxyethyl, 2-propoxyethyl, 2-isopropoxyethyl, 2-butoxyethyl, 2- or 3-methoxy-propyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl-, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 2-hydroxyethyl, 2- or 3-hydroxypropyl, 2- or 4-hydroxybutyl, 5-hydroxy-3-oxapentyl, 6-hydroxy-4-oxahexyl, 8-hydroxy-4-oxaoctyl or 9-hydroxy-4,7-dioxanonyl.
In case a), when n is 1 and X is a radical of the formula IIb or IIc, $L^1$ is for example methoxy, ethoxy, propoxy, isopropoxy, butoxy, isobutoxy or sec-butoxy.
In case b), when n is 1 and X is a radical of the formula IIa, $L^1$ is for example methyl, ethyl, propyl, isopropyl, butyl, isobutyl, sec-butyl, phenyl, 2-, 3- or 4-hydroxysulfonylphenyl, 2,3-, 2,4-, 2,5-, 2,6-, 3,4- or 3,5-dihydroxysulfonylphenyl, 2-, 3- or 4-vinylsulfonylphenyl or a radical of the formula

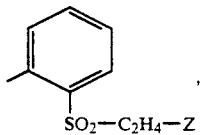

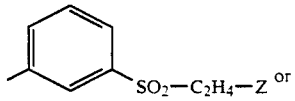 or

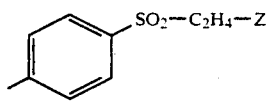

Here Z is a group which is detachable under alkaline reaction conditions. Such groups are for example chlorine, bromine, $C_1$-$C_4$-alkylsulfonyl, phenylsulfonyl, $OSO_3H$, $SSO_3H$, $OP(O)(OH)_2$, $C_1$-$C_4$-alkylsulfonyloxy, substituted or unsubstituted phenylsulfonyloxy, $C_1$-$C_4$-alkanoyloxy, $C_1$-$C_4$-dialkylamino or a radical of the formula

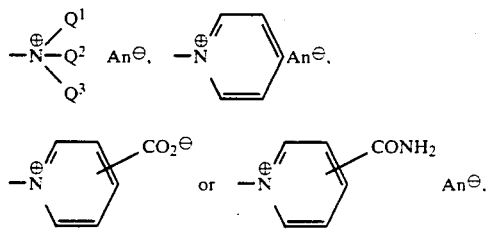

where $Q^1$, $Q^2$ and $Q^3$ are identical or different and each is independently of the others $C_1$-$C_4$-alkyl or benzyl, and $An^\ominus$ is in each case an anion. Suitable anions $An^\ominus$ are for example fluoride, chloride, bromide, iodide, mono-, di- or trichloroacetate, methanesulfonate, benzenesulfonate or 2- or 4-methylbenzenesulfonate.

In case c), when n is 2 and X is a radical of the formula IIa, $L^1$ is a bridge member which has one or two hydroxysulfonyl groups.

Suitable bridge members are for example mono- or dihydroxysulfonylphenylene, such as 4-hydroxysulfonyl-1,2-phenylene or 2,5-dihydroxysulfonyl-1,4-phenylene, mono- or dihydroxysulfonylbiphenylene, such as 2-hydroxysulfonyl-4,4,-biphenylene or 2,2'-dihydroxysulfonyl-4,4'-biphenylene, mono- or dihydroxysulfonylstilbenediyl, such as

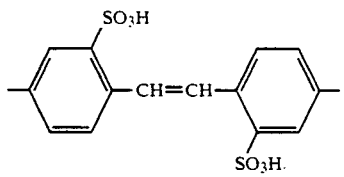

or mono- or dihydroxysulfonyl-4,4'-ureylenebisphenyl, such as

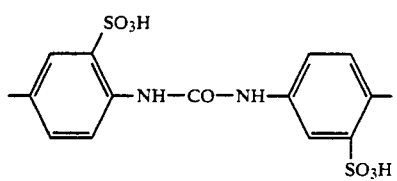

D is derived for example from diazo components of the aniline or aminonaphthalene series which have at least one, preferably one or two, hydroxysulfonyl groups as substituents.

Examples are the following diazo components $L^4$—NH—D—$NH_2$, where $L^4$ is in each case as defined above:

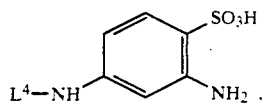

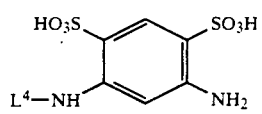

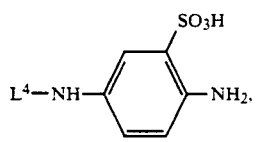

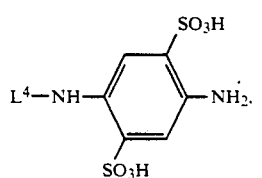

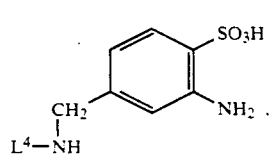

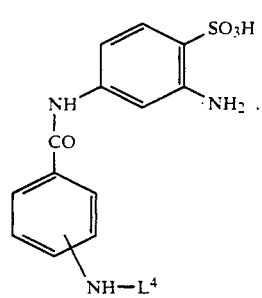

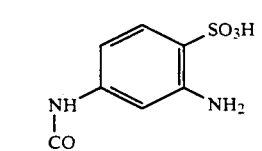

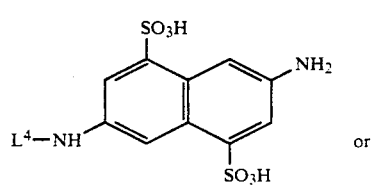

or

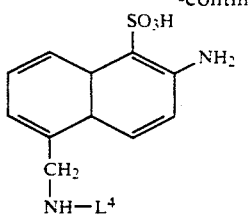

Suitable heterocycles from which the radical $L^3$ is derived belong for example to the class of the pyrroles, pyrazoles, imidazoles, oxazoles, isoxazoles, thiazoles, isothiazoles, triazoles, oxadiazoles, thiadiazoles, pyridines, pyridazines, pyrimidines or pyrazines. These radicals may be substituted for example by $C_1$–$C_{18}$-alkyl, in particular $C_1$–$C_4$-alkyl, or carboxyl.

Of special interest are heterocycles of the class of the imidazoles or pyridines. Radicals $L^3$ derived from such heterocycles conform in particular to the formula

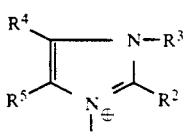

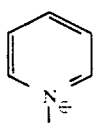

or

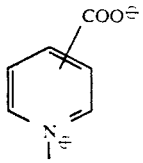

where $R^2$, $R^4$ and $R^5$ are identical or different and each is independently of the others hydrogen or $C_1$–$C_4$-alkyl, and $R^3$ is hydrogen or $C_1$–$C_{18}$-alkyl, in particular $C_1$–$C_4$-alkyl.

The reactive dyes of the formula I are customarily present in the form of inner salts, so that, if the cationic heterocyclic radical $L^3$ contains for example a carboxyl group, the counter-ion is a carboxylate anion; in all other cases the counter-ion is a sulfonate anion.

Preference is given to reactive dyes of the formula I where X is a radical of the formula IIa or IIb and $L^1$ in case a), when n is 1 and X is a radical of the formula IIb, is chlorine, in case b), when n is 1 and X is a radical of the formula IIa, is $C_1$–$C_4$-alkyl or phenyl which may be monosubstituted or disubstituted by hydroxysulfonyl, vinylsulfonyl or the radical —$SO_2$—$C_2H_4$—Z, where Z is a group which is detachable under alkaline reaction conditions, or in case c), when n is 2 and X is a radical of the formula IIa, is a bridge member which has one or two hydroxysulfonyl groups.

Preference is further given to reactive dyes of the formula I where D is the radical of a diazo component of the aniline series which has one or two hydroxysulfonyl groups.

Particular preference is given to reactive dyes of the formula Ia

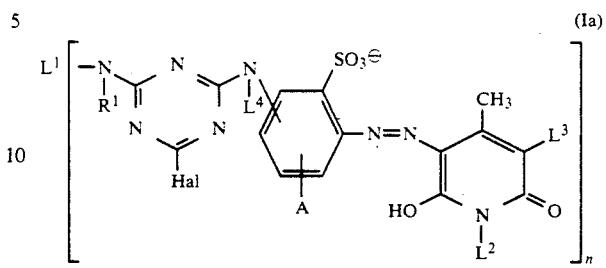

where n, $R^1$, Hal, $L^3$ and $L^4$ are each as defined above, $L^2$ is hydrogen or $C_1$–$C_4$-alkyl, A is hydrogen or hydroxysulfonyl, and $L^1$, when n is 1, is $C_1$–$C_4$-alkyl or phenyl which may be monosubstituted or disubstituted by hydroxysulfonyl, vinylsulfonyl or the radical —$SO_2$—$C_2H_4$—Z, where Z is a group which is detachable under alkaline reaction conditions, or, when n is 2, is mono- or dihydroxysulfonylphenylene, mono- or dihydroxysulfonylbiphenylene, mono- or dihydroxysulfonylstilbenediyl or mono- or dihydroxysulfonyl-4,4'-ureylenebisphenyl.

Of particular interest are reactive dyes of the formula Ia where $L^3$ is the cationic radical of a heterocycle of the imidazole or pyridine series which is attached to the pyridone ring via the nitrogen atom.

Of particular suitability are reactive dyes of the formula Ia where $L^3$ is the radical of the formula

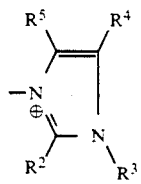

where $R^2$, $R^3$, $R^4$ and $R^5$ are each independently of the others hydrogen or $C_1$–$C_4$-alkyl.

The reactive dyes of the formula I according to the present invention can be prepared in a conventional manner.

For example, a diazo component of the formula III

$L^4$—NH—D—NH$_2$ (III), where $L^4$ and D are each as defined above, can be reacted with a haloheterocycle of the formula IVa or IVb

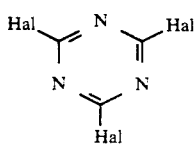

(IVa)

-continued

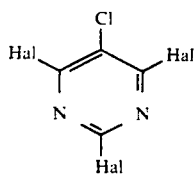 (IVb)

where Hal is fluorine or chlorine, and the resulting condensation product of the formula Va or Vb

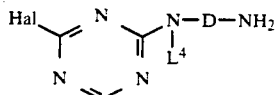 (Va)

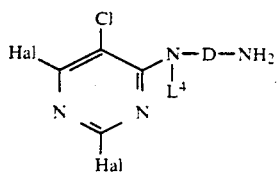 (Vb)

where Hal, $L^4$ and D are each as defined above, reacted with a $C_1$–$C_4$-alkanol, phenol or an amine of the formula VI

 (VI), where $L^1$, $R^1$ and n are each as defined above. Depending on n, a molar ratio of condensation product Va/Vb: amine VI of about 1:1 or 2:1 should be maintained here.

The resulting intermediate of the formula VII

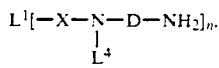 (VII)

where $L^1$, X, $L^4$, D and n are each as defined above, is then diazotized and coupled with a pyridone of the formula VIII

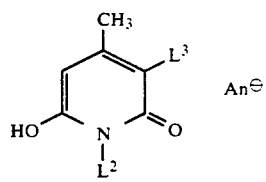 (VIII)

where $L^2$ and $L^3$ are each as defined above and $An^{\ominus}$ is one equivalent of an anion, for example halide, such as chloride, bromide or iodide, or sulfate. (If $L^3$ is derived from a pyridinecarboxylic acid, there is of course no external anion $An^{\ominus}$ present, since in this case the radical $L^3$, as mentioned earlier, is present in the form of an inner salt.)

It is also possible to diazotize the condensation product Va or Vb and to couple its diazonium product with the pyridone VIII to form the reactive dyes of the formula Ib or Ic

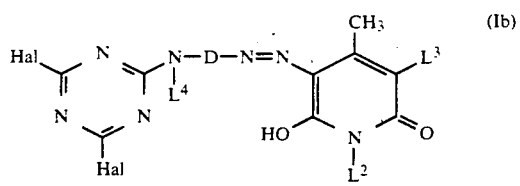 (Ib)

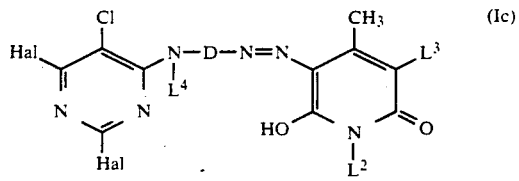 (Ic)

where Hal, $L^4$, D, $L^2$ and $L^3$ are each as defined above. These reactive dyes may then be additionally reacted with an amine of the formula VI.

The novel reactive dyes of the formula I are advantageously suitable for dyeing or printing hydroxyl-or nitrogen-containing organic substrates. Such substrates are for example leather or fiber materials which predominantly contains natural or synthetic polyamides or natural or regenerated cellulose. The novel dyes are preferably suitable for dyeing or printing textile material based on wool or in particular cotton.

The dyes of the present invention produce brilliant greenish yellow to reddish yellow dyeings which have a high light fastness and good wet fastness properties, in particular a high peroxide wash fastness and a high peroxide bleach fastness.

The examples which follow further illustrate the invention.

EXAMPLE 1

25.3 g (0.1 mol) of aniline-2,5-disulfonic acid were dissolved in 200 ml of water at pH 7 and admixed at 0° C. with a suspension of 18.5 g (0.1 mol) of cyanuric chloride in 250 ml of ice-water. Sodium bicarbonate was added to maintain a pH of from 6 to 7 at from 0° to 5° C. for 2 hours.

When free amino groups were no longer detectable, the mixture was filtered and the filtrate was admixed with a neutral solution of 18.8 g (0.1 mol) of 1,3-diaminobenzene-4-sulfonic acid in 200 ml of water. The reaction was then stirred at 15°–20° C. and pH 6–7 until it had ended, as detected by thin layer chromatography. The secondary condensation product thus obtained was diazotized in the presence of hydrochloric acid at 0°–5° C. and admixed with 24.2 g of 3-(3-methylimidazol-1-ylium)-4-methyl-6-hydroxypyrid-2-one hydrochloride. Sodium bicarbonate was added to complete the coupling at pH 6–7. Sodium chloride was added to salt out the dye of the formula

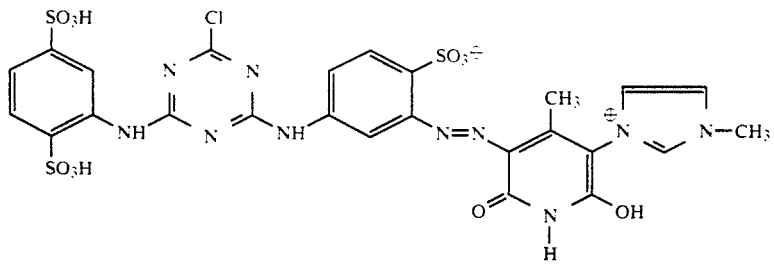

It dyes cotton in a brilliant greenish yellow shade having a good light fastness and good wet fastness properties, in particular good peroxide wash and bleach fastness properties.

EXAMPLE 2

55.3 g (0.1 mol) of the secondary condensation product of 1,3-diaminobenzene-4,6-disulfonic acid, cyanuric chloride and aniline-4-sulfonic acid were diazotized in 600 ml of ice-water in the presence of hydrochloric acid and admixed with 24.2 g (0.1 mol) of 3-(3-methylimidizol-1-ylium)-4-methyl-6-hydroxypyrid-2-one hydrochloride. Sodium bicarbonate was added to complete the coupling at pH 6-7, and the dye formed was precipitated with sodium chloride. It conforms to the formula

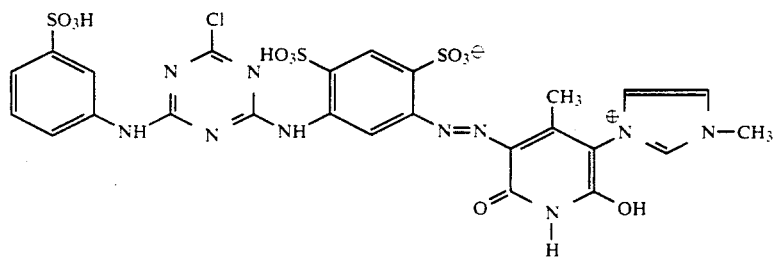

and dyes cotton in a brilliant greenish yellow shade having a good light fastness and good wet fastness properties, in particular good peroxide wash and bleach fastness properties.

The method of Examples 1 and 2 is also used to obtain the Examples of Table 1.

TABLE 1

| Example No. | $Y^1$ | Hal | A | $Y^2$ | $Y^3$ | Hue on cotton |
|---|---|---|---|---|---|---|
| 3 | HO₃S—⌬—NH— (with SO₃H) | Cl | H | H | —N⊕⟍⟋N—CH₃ | Greenish yellow |
| 4 | SO₃H—⌬—NH— (with SO₃H) | F | H | H | —N⊕⟍⟋N—CH₃ | Greenish yellow |
| 5 | SO₃H—⌬—NH— | Cl | H | H | —N⊕⟍⟋N—CH₃ | Greenish yellow |

TABLE 1-continued

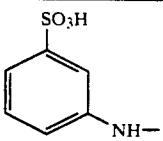

| Example No. | Y¹ | Hal | A | Y² | Y³ | Hue on cotton |
|---|---|---|---|---|---|---|
| 6 | 3-sulfophenyl-NH— | Cl | H | H | —N⊕=CH—N(CH₃)=CH— (imidazolium) | Greenish yellow |
| 7 | 4-sulfophenyl-NH— | Cl | SO₃H | H | imidazolium-N-CH₃ | Greenish yellow |
| 8 | 2-sulfophenyl-NH— | Cl | SO₃H | H | imidazolium-N-CH₃ | Greenish yellow |
| 9 | 3-sulfophenyl-NH— | F | H | H | imidazolium-N-CH₃ | Greenish yellow |
| 10 | 2,5-disulfophenyl-NH— | Cl | H | CH₃ | imidazolium-N-CH₃ | Greenish yellow |
| 11 | 2,4-disulfophenyl-NH— | Cl | H | CH₃ | imidazolium-N-CH₃ | Greenish yellow |
| 12 | 2-sulfophenyl-NH— | Cl | SO₃H | CH₃ | imidazolium-N-CH₃ | Greenish yellow |
| 13 | 3-sulfophenyl-NH— | Cl | SO₃H | CH₃ | imidazolium-N-CH₃ | Greenish yellow |
| 14 | 4-sulfophenyl-NH— | Cl | SO₃H | CH₃ | imidazolium-N-CH₃ | Greenish yellow |

TABLE 1-continued
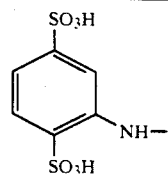
| Example No. | Y¹ | Hal | A | Y² | Y³ | Hue on cotton |
|---|---|---|---|---|---|---|
| 15 | 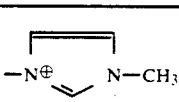 | Cl | H | $C_2H_5$ | 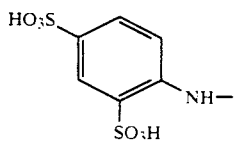 | Greenish yellow |
| 16 | 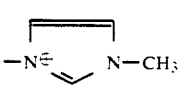 | Cl | H | $C_2H_5$ | 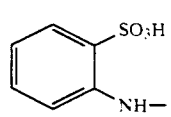 | Greenish yellow |
| 17 | 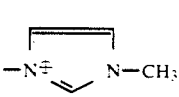 | Cl | $SO_3H$ | $C_2H_5$ | 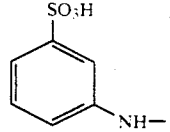 | Greenish yellow |
| 18 | 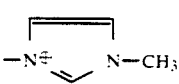 | Cl | $SO_3H$ | $C_2H_5$ | 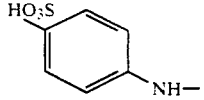 | Greenish yellow |
| 19 | 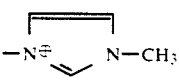 | Cl | $SO_3H$ | $C_2H_5$ | 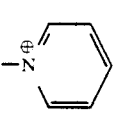 | Greenish yellow |
| 20 | Cl | Cl | $SO_3H$ | H | 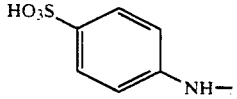 | Greenish yellow |
| 21 | 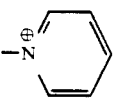 | Cl | $SO_3H$ | H | 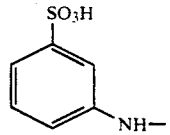 | Greenish yellow |
| 22 | 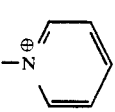 | Cl | $SO_3H$ | H | 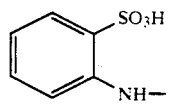 | Greenish yellow |
| 23 | 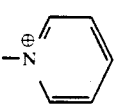 | Cl | $SO_3H$ | H | 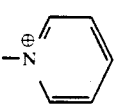 | Greenish yellow |

TABLE 1-continued

[Structure: triazine with Hal, Y¹, linked via NH to benzene ring with A and SO₃⁻ substituents, azo-linked to methyl-pyridone with Y², Y³ substituents]

| Example No. | Y¹ | Hal | A | Y² | Y³ | Hue on cotton |
|---|---|---|---|---|---|---|
| 24 | 2,5-disulfo-phenyl-NH— (SO₃H, SO₃H) | Cl | H | H | —N⊕(pyridinium) | Greenish yellow |
| 25 | 2,4-disulfo-phenyl-NH— (HO₃S, SO₃H) | Cl | H | H | —N⊕(pyridinium) | Greenish yellow |
| 26 | 3-sulfo-phenyl-NH— (SO₃H) | Cl | H | H | —N⊕(pyridinium)-COO⊖ | Greenish yellow |
| 27 | 4-sulfo-phenyl-NH— (HO₃S) | Cl | H | H | —N⊕(pyridinium)-COO⊖ | Greenish yellow |
| 28 | HO₃SO—C₂H₄—SO₂—(4-phenyl)—NH— | Cl | H | H | —N⊕⟨N—CH₃⟩ (imidazolium) | Greenish yellow |
| 29 | HO₃SO—C₂H₄—SO₂—(4-phenyl)—NH— | Cl | SO₃H | H | —N⊕⟨N—CH₃⟩ (imidazolium) | Greenish yellow |
| 30 | 3-(HO₃SO—C₂H₄—SO₂)-phenyl-NH— | Cl | H | H | —N⊕⟨N—CH₃⟩ (imidazolium) | Greenish yellow |
| 31 | 3-(HO₃SO—C₂H₄—SO₂)-phenyl-NH— | F | H | H | —N⊕⟨N—CH₃⟩ (imidazolium) | Greenish yellow |
| 32 | 3-(HO₃SO—C₂H₄—SO₂)-phenyl-NH— | Cl | SO₃H | H | —N⊕⟨N—CH₃⟩ (imidazolium) | Greenish yellow |

TABLE 1-continued

| Example No. | Y¹ | Hal | A | Y² | Y³ | Hue on cotton |
|---|---|---|---|---|---|---|
| 33 | HO₃SO—C₂H₄—SO₂ substituted phenyl-NH— | Cl | SO₃H | H | pyridinium | Greenish yellow |

EXAMPLE 34

33.6 g (0.1 mol) of the condensation product of 1,3-diaminobenzene-4-sulfonic acid and cyanuric chloride were stirred in 500 ml of ice-water at pH 6–7 and 30°–35° C. with 10.1 g (0.05 mol) of 1-amino-3-methylaminobenzene-4-sulfonic acid until the reaction had ended, as detected by thin layer chromatography. This was followed by a diazotization in the presence of hydrochloric acid and the addition of 24.2 g of 3-(3-methylimidazol-1-ylium)-4-methyl-6-hydroxypyrid-2-one hydrochloride. Sodium bicarbonate was added to complete the coupling at pH 6–7. The dye obtained conforms to the formula

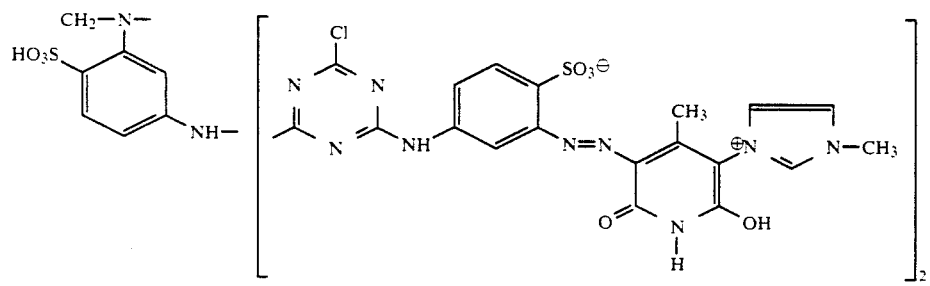

It was precipitated with sodium chloride and dyes cotton in a greenish yellow shade having a good light fastness and good wet fastness properties.

The method of Example 34 is also used to obtain the dyes listed in Table 2.

TABLE 2

| Example No. | L¹ | Hal | A | L² | L³ | Hue on cotton |
|---|---|---|---|---|---|---|
| 35 | stilbene-disulfonic acid derivative | Cl | SO₃H | H | —N⁺=CH—N—CH₃ (methylimidazolium) | Greenish yellow |

TABLE 2-continued

| Example No. | L¹ | Hal | A | L² | L³ | Hue on cotton |
|---|---|---|---|---|---|---|
| 36 | 4-sulfo-2-(2-sulfophenyl-vinyl)phenyl (stilbene-2,2'-disulfonic acid) | Cl | H | H | -N⁺=CH-CH=CH-N(CH₃)- (N-methylimidazolium) | Greenish yellow |
| 37 | 2,2'-disulfobiphenyl-4-yl | Cl | SO₃H | H | -N⁺=CH-CH=CH-N(CH₃)- | Greenish yellow |
| 38 | 2,2'-disulfobiphenyl-4-yl | Cl | H | H | -N⁺=CH-CH=CH-N(CH₃)- | Greenish yellow |
| 39 | 3,4-dimethyl-sulfophenyl | Cl | SO₃H | H | -N⁺=CH-CH=CH-N(CH₃)- | Greenish yellow |
| 40 | 3,4-dimethyl-sulfophenyl | Cl | H | H | -N⁺=CH-CH=CH-N(CH₃)- | Greenish yellow |
| 41 | 2,5-disulfophenyl | Cl | SO₃H | H | -N⁺=CH-CH=CH-N(CH₃)- | Greenish yellow |
| 42 | 2,5-disulfophenyl | Cl | H | H | -N⁺=CH-CH=CH-N(CH₃)- | Greenish yellow |

TABLE 2-continued

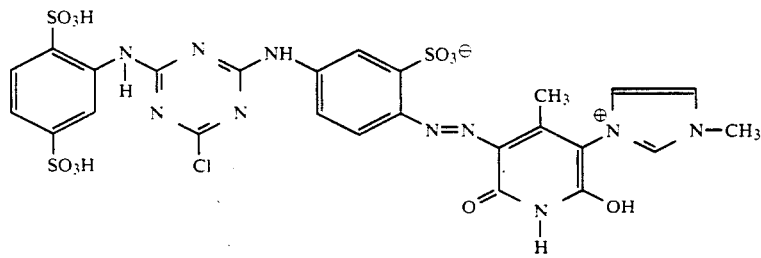

| Example No. | L¹ | Hal | A | L² | L³ | Hue on cotton |
|---|---|---|---|---|---|---|
| 43 | 2-SO₃H, 4-methyl-phenyl-NH-CO-NH-3-methyl-phenyl-SO₃H | Cl | SO₃H | H | $-N^{\oplus}\!\!=\!\!\text{CH-CH}=\!\!N-CH_3$ (imidazolium) | Greenish yellow |
| 44 | 2-SO₃H, 4-methyl-phenyl-NH-CO-NH-3-methyl-phenyl-SO₃H | Cl | H | H | $-N^{\oplus}\!\!=\!\!\text{CH-CH}=\!\!N-CH_3$ (imidazolium) | Greenish yellow |

EXAMPLE 45

Example 1 was repeated, except that the 1,3-diaminobenzene-4-sulfonic acid was replaced by 1,4-diaminobenzene-2-sulfonic acid, affording, after salting out with sodium chloride, the dye of the formula

[Structure of the dye]

It dyes cotton in a reddish yellow shade having a good light fastness and good wet fastness properties.

The method of Example 2 is also used to obtain the dyes listed in Table 3.

TABLE 3

[General formula structure]

| Example No. | L¹ | Hal | A | L² | L³ | Hue on cotton |
|---|---|---|---|---|---|---|
| 46 | 2-methyl-5-SO₃H-phenyl (HO₃S-) | Cl | H | H | $-N^{\oplus}\!\!=\!\!\text{CH-CH}=\!\!N-CH_3$ (imidazolium) | Reddish yellow |

TABLE 3-continued

[Structure: L¹-NH-C(=N)-N=C(Hal)-N=C-NH-[benzene ring with A, SO₃⁻]-N=N-[pyridone with CH₃, L³, =O, N-L², OH]]

| Example No. | L¹ | Hal | A | L² | L³ | Hue on cotton |
|---|---|---|---|---|---|---|
| 47 | 2-SO₃H-phenyl | Cl | SO₃H | H | −N⊕=CH−N(CH₃)−CH=CH− (N-methylimidazolium) | Reddish yellow |
| 48 | 3-SO₃H-phenyl | Cl | SO₃H | H | N-methylimidazolium | Reddish yellow |
| 49 | 4-SO₃H-phenyl | Cl | SO₃H | H | N-methylimidazolium | Reddish yellow |
| 50 | 4-(HO₃SO—C₂H₄—SO₂)-phenyl | Cl | SO₃H | H | N-methylimidazolium | Reddish yellow |
| 51 | 3-(HO₃SO—C₂H₄—SO₂)-phenyl | Cl | SO₃H | H | N-methylimidazolium | Reddish yellow |
| 52 | 2,5-disulfo-phenyl | Cl | H | H | pyridinium | Reddish yellow |
| 53 | 2,4-disulfo-phenyl | Cl | H | H | pyridinium | Reddish yellow |
| 54 | 2-SO₃H-phenyl | Cl | SO₃H | H | pyridinium | Reddish yellow |
| 55 | 3-SO₃H-phenyl | Cl | SO₃H | H | pyridinium | Reddish yellow |

TABLE 3-continued

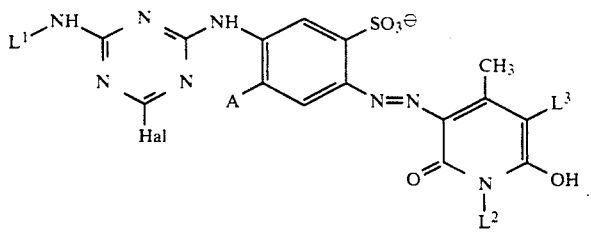

| Example No. | L¹ | Hal | A | L² | L³ | Hue on cotton |
|---|---|---|---|---|---|---|
| 56 | phenyl-SO₃H (HO₃S on ring) | Cl | SO₃H | H | pyridinium (−N⊕ pyridine) | Reddish yellow |

EXAMPLE 57

41.6 g of the condensation product of 1,4-diamino-benzene-2,5-disulfonic acid and cyanuric chloride were diazotized in 500 ml of ice-water in the presence of hydrochloric acid and admixed with 24.2 g of 3-(3-methylimidazol-1-ylium)J-4-methyl-6-hydroxypyrid-2-one hydrochloride. The coupling was completed by raising the pH to 6–7. Then 9.4 g (0.05 mol) of 1.2-diaminobenzene-3-sulfonic acid, dissolved under neutral conditions in 200 ml of water, were added, and the mixture was stirred at pH 6–7 and 40°–45° C. for 2 hours. After the reaction had ended, sodium chloride was added to salt out the dye of the formula

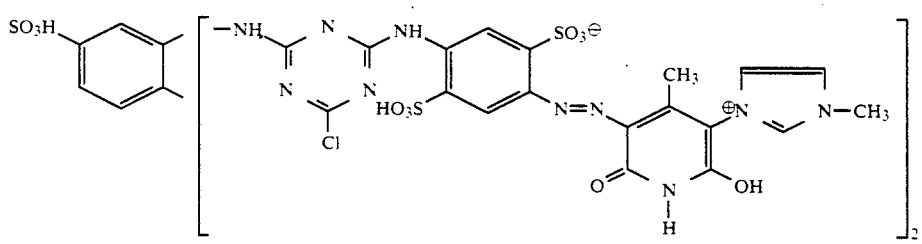

which was filtered off. It dyes cotton in a brilliant reddish yellow shade having a good light fastness and good wet fastness properties.

The same method is used to obtain the dyes listed in Table 4.

TABLE 4

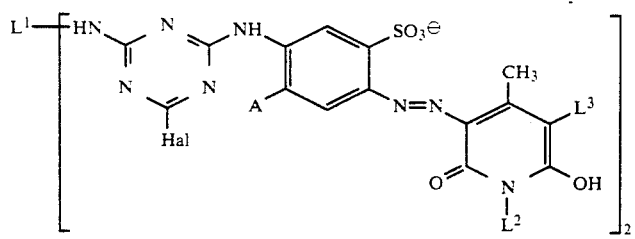

| Example No. | L¹ | Hal | A | L² | L³ | Hue on cotton |
|---|---|---|---|---|---|---|
| 58 | stilbene-2,2'-disulfonic acid derivative (SO₃H groups) | Cl | SO₃H | H | methylimidazolium (−N⊕...N−CH₃) | Greenish yellow |

TABLE 4-continued

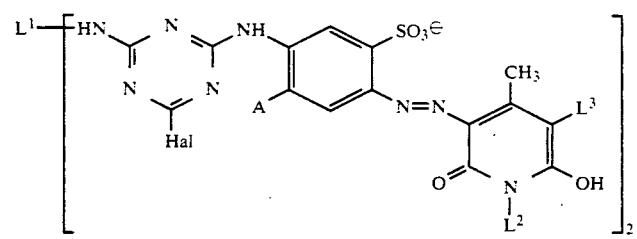

| Example No. | L¹ | Hal | A | L² | L³ | Hue on cotton |
|---|---|---|---|---|---|---|
| 59 | 2,4-disubstituted benzene with SO₃H (stilbene-type, one ring with SO₃H) | Cl | H | H | $-N^{\oplus}\underset{\smile}{\frown}N-CH_3$ (imidazolium) | Greenish yellow |
| 60 | stilbene with SO₃H on each ring | Cl | SO₃H | H | $-N^{\oplus}\underset{\smile}{\frown}N-CH_3$ | Greenish yellow |
| 61 | biphenyl with SO₃H on each ring | Cl | H | H | $-N^{\oplus}\underset{\smile}{\frown}N-CH_3$ | Greenish yellow |
| 62 | benzene with SO₃H | Cl | H | H | $-N^{\oplus}\underset{\smile}{\frown}N-CH_3$ | Greenish yellow |
| 63 | benzene-1,4-disulfonic acid substituted | Cl | SO₃H | H | $-N^{\oplus}\underset{\smile}{\frown}N-CH_3$ | Greenish yellow |
| 64 | benzene with SO₃H and SO₃S | Cl | H | H | $-N^{\oplus}\underset{\smile}{\frown}N-CH_3$ | Greenish yellow |
| 65 | bis(SO₃H-phenyl)urea (—NH—CO—NH—) | Cl | SO₃H | H | $-N^{\oplus}\underset{\smile}{\frown}N-CH_3$ | Greenish yellow |

TABLE 4-continued

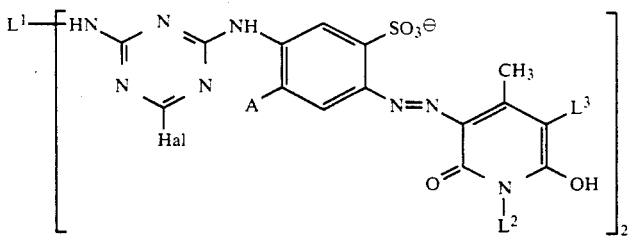

| Example No. | L¹ | Hal | A | L² | L³ | Hue on cotton |
|---|---|---|---|---|---|---|
| 66 | [structure: benzene with SO₃H and NH-CO-NH-phenyl-SO₃H] | Cl | H | H | [structure: -N⊕=CH-N(CH₃) imidazolium] | Greenish yellow |

EXAMPLE 67

17.3 g (0.1 mol) of aniline-3-sulfonic acid were dissolved in 200 ml of water at pH 7 and admixed with a suspension of 18.5 g (0.1 mol) of cyanuric chloride in 200 ml of ice-water. Once free amino groups were no longer detectable, the mixture was filtered. The filtrate was admixed with a neutral solution of 2.02 g (0.1 mol) of 1-(N-methylaminomethyl)-3-aminobenzene-4-sulfonic acid in 300 ml of water, the mixture was stirred at 30° C. and pH 8.5–9 for 2 hours.

The secondary condensation product obtained was diazotized at 0°–5° C. in the presence of hydrochloric acid and admixed with 24.2 g (0.1 mol) of 3-(3-methylimidazol-1-ylium)-4-methyl-6-hydroxypyrid-2-one hydrochloride. The coupling was completed by raising the pH to 6–7. Sodium chloride was added to the resulting suspension to salt out the dye of the formula

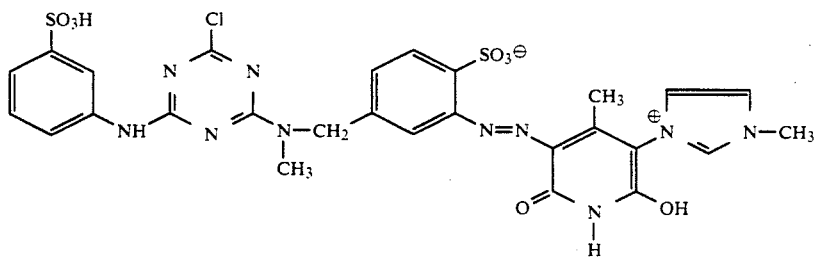

which was filtered off. It dyes cotton in a brilliant greenish yellow shade having a good light fastness and good wet fastness properties.

EXAMPLE 68

To 25.7 g (0.1 mol) of the hydrochloric acid diazonium salt of the condensation product of 5-chloro-2,4,6-trifluoropyrimidine and 1,3-diaminobenzene-4,6-disulfonic acid were added at 0°–5° C. 24.3 g (0.1 mol) of 3-(3-methylimidazol-1-ylium)-4-methyl-6-hydroxypyrid-2-one hydrochloride. Sodium bicarbonate was added to complete the coupling at pH 6–7. The dye obtained had the formula

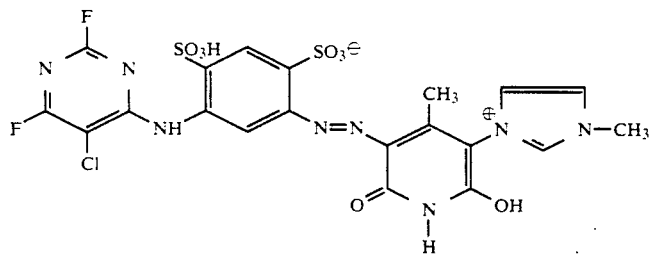

and was precipitated with sodium chloride. It dyes cotton sin a brilliant greenish yellow shade which has a good light fastness and good wet fastness properties.

We claim:

1. A reactive dye of the formula I

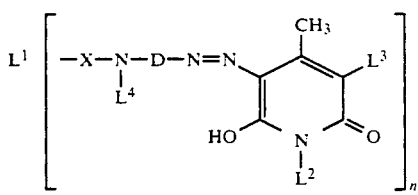

where
n is 1 or 2,
X is
in case a), when n is 1, a radical of the formula IIa, IIB or IIc

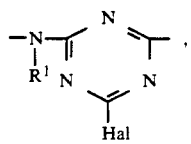  IIa

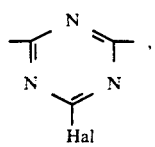  IIb

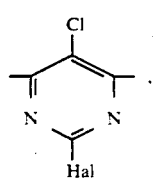  IIc where $R^1$ is hydrogen or $C_1$–$C_4$-alkyl and Hal is fluorine or chlorine; or
in case b), when n is 2, a radical of the above-mentioned formula IIa,
$L^1$ is:
in case a), when n is 1 and X is a radical of the formula IIb or IIc, fluorine, chlorine, $C_1$–$C_4$-alkoxy or phenoxy; or
in case b), when n is 1 and X is a radical of the formula IIa, $C_1$–$C_4$-alkyl, phenyl, or phenyl monosubstituted or disubstituted by hydroxysulfonyl, vinylsulfonyl or the radical

—$SO_2$—$C_2H_4$—Z.

where
Z is a group which is detachable under alkaline reaction conditions; or
in case c), when n is 2 and X is a radical of the formula IIa, is selected from the group consisting of phenylene, biphenylene, stilbenediyl and ureylenebisphenyl, each of which is substituted by one or two hydroxysulfonyl groups,
D is the radical of an aniline or aminonaphthalene diazo component which has at least one hydroxysulfonyl group,
$L^2$ is hydrogen, $C_1$–$C_8$-alkyl, or $C_2$–$C_8$-alkyl which is substituted by hydroxyl and/or interrupted by one or two oxygen atoms which form an ether grouping;
$L^3$ is unsubstituted or substituted pyrrolium, pyrazolium, imidazolium, oxazolium, isoxazolium, thiazolium, isothiazolium, triazolium, oxadiazolium, thiadiazolium, pyridinium, pyridazinium, pyrimidinium or pyrazinium, wherein said substituents are selected from the group consisting of $C_1$–$C_{18}$-alkyl and carboxyl; and
$L^4$ is hydrogen or $C_1$–$C_4$-alkyl, with the proviso that the number of hydroxysulfonyl groups in the molecule exceeds that of the cationic groups by at least one.

2. A reactive dye as claimed in claim 1, wherein X is a radical of the formula IIa or IIb and $L^1$ in case a), when n is 1 and X is a radical of the formula IIb, is chlorine, or
in case b), when n is 1 and X is a radical of the formula IIa, is $C_1$–$C_4$-alkyl, phenyl or phenyl monosubstituted or disubstituted by hydroxysulfonyl, vinylsulfonyl or the radical

—$SO_2$—$C_2H_4$—Z where Z is a group which is detachable under alkaline reaction conditions, or
in case c), when n is 2 and X is a radical of the formula IIa, is phenylene, biphenylene, stilbenediyl or ureylenebisphenyl, each of which is substituted by one or two hydroxysulfonyl groups.

3. A reactive dye as claimed in claim 1, wherein D is the radical of an aniline diazo component which has one or two hydroxysulfonyl groups.

4. A reactive dye as claimed in claim 1 of the formula Ia

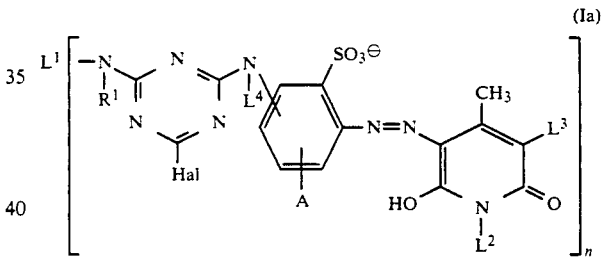

where
n, $R^1$, Hal, $L^3$ and $L^4$ are each as defined in claim 6,
$L^2$ is hydrogen or $C_1$–$C_4$-alkyl,
A is hydrogen or hydroxysulfonyl and
$L^1$, when n is 1, is $C_1$–$C_4$-alkyl, phenyl or phenyl monosubstituted or disubstituted by hydroxysulfonyl, vinylsulfonyl or the radical

—$SO_2$—$C_2H_4$—Z, where Z is a group which is detachable under alkaline reaction conditions, or, when n is 2, is mono- or dihydroxysulfonylphenylene, mono- or dihydroxysulfonylbiphenylene, mono- or dihydroxysulfonylstilbenediyl or mono- or dihydroxysulfonyl-4,4'-ureylenebisphenyl.

5. A reactive dye according to claim 4 wherein $L^3$ is selected from the group consisting of pyridinium, pyridinium substituted by carboxylate anion, imidazolium, and imidazolium substituted by up to four $C_1$–$C_4$-alkyl groupings.

6. A method for dyeing or printing hydroxyl- or nitrogen-containing substrates comprising contacting said substrate with a reactive dye according to claim 1.

* * * * *